United States Patent
Schubert et al.

(10) Patent No.: US 7,601,434 B2
(45) Date of Patent: Oct. 13, 2009

(54) PLAIN BEARING COMPOSITE MATERIAL

(75) Inventors: Werner Schubert, Wiesloch (DE); Klaus Deicke, Untereisesheim (DE); Thomas Steffens, Bad-Rappenau-Zimmerhof (DE); Bernd Mueller, Kirrlach (DE)

(73) Assignee: KS Gleitlager GmbH, Leon-Rot (DE)

( * ) Notice: Subject to any disclaimer, the term of this patent is extended or adjusted under 35 U.S.C. 154(b) by 752 days.

(21) Appl. No.: 10/571,926

(22) PCT Filed: Jul. 17, 2004

(86) PCT No.: PCT/EP2004/008015

§ 371 (c)(1), (2), (4) Date: Mar. 15, 2006

(87) PCT Pub. No.: WO2005/038278

PCT Pub. Date: Apr. 28, 2005

(65) Prior Publication Data

US 2007/0026255 A1  Feb. 1, 2007

(30) Foreign Application Priority Data

Sep. 20, 2003 (DE) ................. 103 43 618

(51) Int. Cl.
*F16C 33/12* (2006.01)
*B32B 15/20* (2006.01)
*C22C 21/10* (2006.01)
*C22F 1/053* (2006.01)

(52) U.S. Cl. ............... 428/653; 420/532; 420/537; 420/554; 384/912

(58) Field of Classification Search ................ None
See application file for complete search history.

(56) References Cited

U.S. PATENT DOCUMENTS 4,170,469 A * 10/1979 Mori .................. 428/652
6,273,972 B1   8/2001 Andler

FOREIGN PATENT DOCUMENTS

| DE | 32 47 873 | 7/1983 |
| DE | 42 01 793 | 10/1992 |
| EP | 0 440 275 | 8/1991 |
| EP | 0 908 539 | 4/1999 |
| EP | 0 982 410 | 3/2000 |
| GB | 1 222 262 | 2/1971 |
| WO | WO 96/25527 | 8/1996 |
| WO | WO 2006/074805 | * 7/2006 |

OTHER PUBLICATIONS

J. Xinggang et al. "A study of Grain Refinement and Super-plasticity of a High Strength 7475Al Alloy" Z. Metallkd. 84 (1993) 3, pp. 216-219.

* cited by examiner

*Primary Examiner*—John J Zimmerman
(74) *Attorney, Agent, or Firm*—Paul Vincent

(57) ABSTRACT

The invention relates to a plain bearing composite material comprising a steel carrier layer and a bearing coating which is applied to the carrier layer in such a way that it cannot be removed and consists of lead-free aluminium bearing alloy consisting of between 4.4 and 6 wt. % of zinc, between 2.5 and 6 wt % of bismuth, between 1 and 2 wt. % of silicon, between 0.8 and 1.2 wt. % of copper and between 0.2 and 0.8 wt. % of magnesium, optionally a maximum of 0.2 wt. % each of titanium, nickel, manganese, and tin, optionally a maximum of 0.6 wt. % of iron, and also optionally respectively a maximum of 0.1 wt. % of impurity related additives, the total quantity thereof not amounting to more than 1 wt. % of the sum of the constituents. The aluminium bearing alloy forms an aluminium solid solution supersaturated with zinc, said zinc being finely distributed by solution annealing and subsequent chilling.

9 Claims, No Drawings

PLAIN BEARING COMPOSITE MATERIAL

This application is the national stage of PCT/EP2004/008015 filed on Jul. 17, 2004 and also claims Paris Convention priority of DE 103 43 618.9 filed on Sep. 20, 2003.

BACKGROUND OF THE INVENTION

The invention concerns a plain bearing composite material comprising a carrier layer made from steel and a sliding layer which is disposed thereon in such a manner that it cannot be removed, the sliding layer being made from an aluminium bearing alloy.

Plain bearing composite materials of this type are conventionally known and are used, in particular, for producing plain bearing shells for connecting rod bearings and for crankshaft bearings in the crankcase of a combustion engine of a vehicle. The use of such a plain bearing composite material for producing rolled bearing bushings, e.g. connecting rod bearing bushings or piston pin bushings which bear the piston pin in the piston, is also known in the art.

DE 198 00 433 C2 does not describe plain bearing composite materials comprising a carrier layer made from steel, but deals with a continuous casting method for casting an aluminium plain bearing alloy comprising 3 to 6 weight % of zinc, 0.3 to 2.0 weight % of copper, 0.2 to 1.0 weight % of magnesium, 0.3 to 2.0 weight % of silicon and 2 to 4.5 weight % of lead. Finely distributed drop-shaped lead precipitations are thereby formed in the continuous casting piece with the drops having dimensions of less than 10 µm. When this aluminium alloy is used as a plain bearing alloy, the lead acts as finely and homogeneously distributed lubricant.

EP 0 440 275 B1 also relates to casting of monotectic aluminium bearing alloys. This document discusses aluminium bearing alloys for producing plain bearing materials comprising one or more of the components: 1 to 50 weight %, preferably 5 to 30 weight % of lead, 3 to 50 weight %, preferably 5 to 30 weight % of bismuth, and 15 to 50 weight % indium and additionally one or more of the following components: 0.1 to 20 weight % of silicon, 0.1 to 20 weight % of tin, 0.1 to 10 weight % of zinc, 0.1 to 5 weight % of magnesium, 0.1 to 5 weight % of copper, 0.05 to 3 weight % of iron, 0.05 to 3 weight % of manganese, 0.05 to 3 weight % of nickel and 0.001 to 0.30 weight % of titanium. This document does not give any further information about the exact composition of an aluminium alloy.

EP 0 190 691 A1 discloses a plain bearing composite material comprising a carrier layer made from steel and a sliding layer which is disposed thereon in such a manner that it cannot be removed and consists of an aluminium bearing alloy composed substantially of 4 to 9 weight % of bismuth, 1 to 4.5 weight % of silicon, 0 to 1.7 weight % of copper, 0 to 2.5 weight % of lead, the rest being aluminium, in accordance with claim 1 of this document. Claim 3 of this document mentions one or more of the materials selected from the group consisting of nickel, manganese, chromium, tin, antimony and zinc as further additives, wherein the portion of zinc may amount to up to 5 weight %. The compositions of the aluminium bearing alloy precisely disclosed in this document suggest that the combined use of bismuth and lead is advantageous.

A plain bearing composite material comprising a carrier layer of steel and a sliding layer disposed thereon in an irremovable fashion and consisting of AlZn5Pb4Si1.5Cu1Mg has been disclosed under the trade name KS R41.

It is the object of the present invention to provide an environment-friendly plain bearing composite material of the above-mentioned type, comprising an aluminium bearing alloy which is easy to cast and shape and at the same time has excellent tribological properties.

This object is achieved in accordance with the invention by a plain bearing composite material comprising the features of the independent claim.

SUMMARY OF THE INVENTION

It has turned out in accordance with the invention that lead can be omitted by adding bismuth in an amount of 2.5 to 6 weight %, in particular between 2.5 to 4.5 weight % and by providing a zinc content of between 4.4 and 6 weight %, preferably at least 5 weight %. It is assumed that bismuth of an amount within the above-mentioned weight % range interacts with the fine zinc precipitations in the aluminium mixed crystal, which is oversaturated with zinc, the bismuth yielding, as an additive, friction reducing properties which are substantially identical to those of the lubricant lead, i.e. it acts as a lubricant. This finding is by no means obvious, since, up to now and as mentioned above, aluminium bearing alloys containing bismuth attained their excellent features especially through the addition of lead.

DESCRIPTION OF THE PREFERRED EMBODIMENT

Zinc precipitations of a particle size of less than 10 µm are preferably obtained by solution annealing directly followed by chilling.

A preferred composition of a lead-free aluminium bearing alloy is provided by AlZn5Bi4Si1.5Cu1Mg.

The further components silicon, copper and mainly magnesium, which are provided in addition to zinc and bismuth, are essential for obtaining the satisfying and advantageous properties of the inventive plain bearing composite material. Magnesium has a solidifying effect. Together with aluminium, it forms the intermetallic phase $Al_3Mg_2$. Copper advantageously forms the intermetallic phase $Al_2Cu$. This increases the strength of the aluminium mixed crystal, since these components load the crystal thereby stabilizing and hardening it.

We claim:

1. A plain bearing composite material comprising:
   a carrier layer made from steel; and
   a sliding layer disposed on said carrier layer in an irremovable fashion, said sliding layer having an aluminium bearing alloy comprising 4.4 to 6 weight % of zinc, 2.5 to 6.0 weight % of bismuth, 1.0 to 2.0 weight % of silicon, 0.8 to 1.2 weight % of copper and 0.2 to 0.8 weight % of magnesium, wherein said aluminium bearing alloy forms an aluminium mixed crystal which is supersaturated with zinc, said zinc being finely distributed by solution annealing and subsequent chilling.

2. A bearing composite material of claim 1, further comprising titanium, nickel, manganese, or tin, each in amounts of not more than 0.2 weight %.

3. A bearing composite material of claim 1, further comprising iron in an amount of up to 0.6 weight %.

4. A bearing composite material of claim 1, further comprising impurity-related additives of maximally 0.1 weight % each, an overall quantity thereof amounting to maximally 1 weight %.

5. A bearing composite material of claim 2, further comprising iron in an amount of up to 0.6 weight %.

6. A bearing composite material of claim 5, further comprising impurity-related additives of maximally 0.1 weight % each, an overall quantity thereof amounting to maximally 1 weight %.

7. The plain bearing composite of claim 5, wherein said zinc is present in a particle size of less than 10 μm.

8. The plain bearing composite material of claim 5, wherein the material comprises 2.5 to 4.5 weight % of bismuth.

9. The plain bearing composite material of claim 5, wherein the material comprises at least 5 weight % of zinc.

* * * * *